No. 831,860. PATENTED SEPT. 25, 1906.
F. J. HALL & A. W. HAWKINSON.
WHEEL.
APPLICATION FILED FEB. 2, 1905.
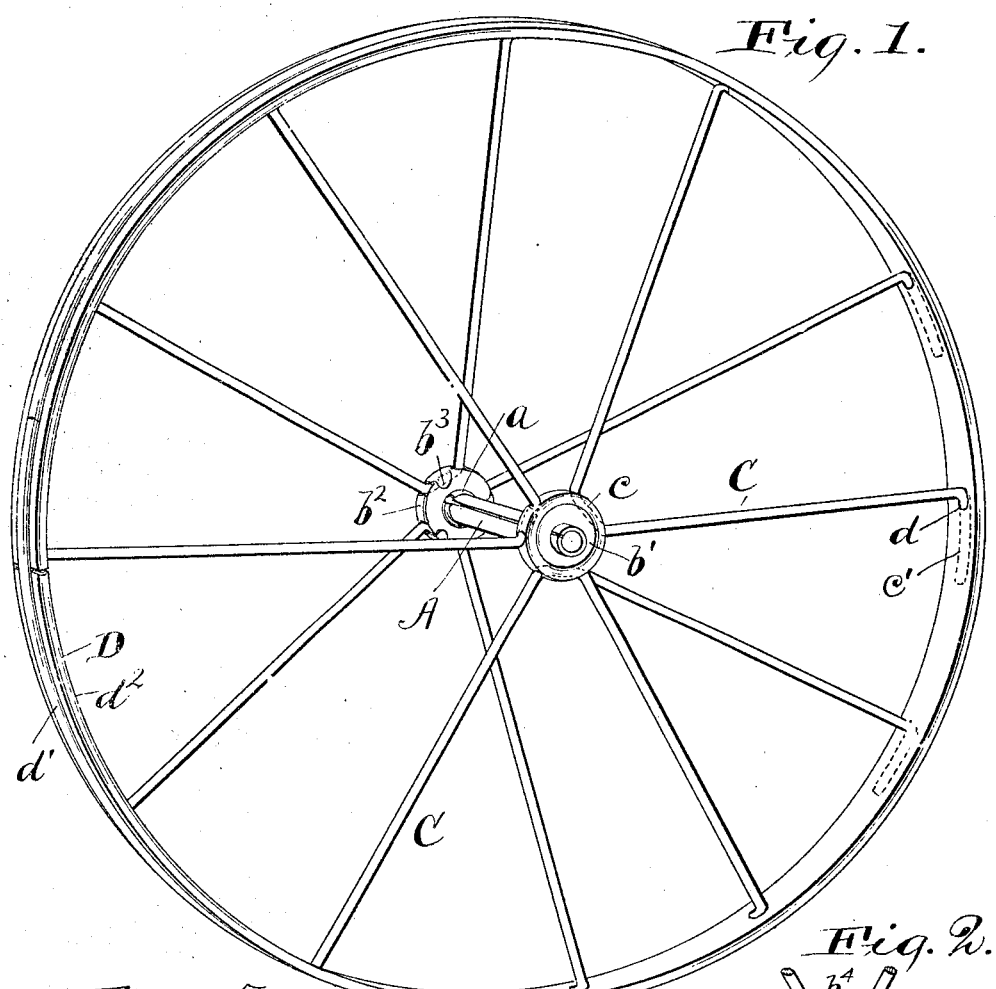
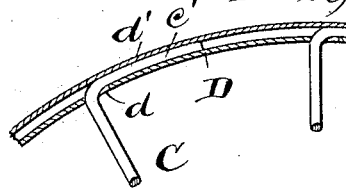
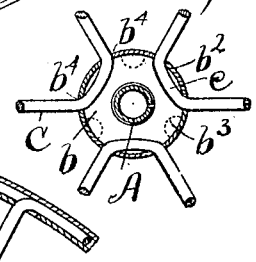
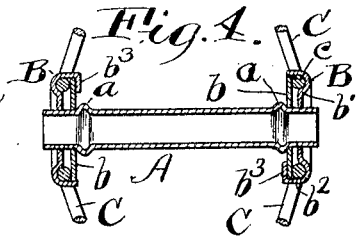
Witnesses.
E. B. Gilchrist
J. S. Kohn
Inventors,
Frank John Hall,
Axel W. Hawkinson,
By Thurston & Bates,
Attorneys.

UNITED STATES PATENT OFFICE.

FRANK JOHN HALL AND AXEL W. HAWKINSON, OF ELYRIA, OHIO, ASSIGNORS TO WALTER E. BROOKS, OF ELYRIA, OHIO.

WHEEL.

No. 831,860.     Specification of Letters Patent.     Patented Sept. 25, 1906.

Application filed February 2, 1905. Serial No. 243,798.

*To all whom it may concern:*

Be it known that we, FRANK JOHN HALL and AXEL W. HAWKINSON, citizens of the United States, residing at Elyria, in the county of Lorain and State of Ohio, have invented a certain new and useful Improvement in Wheels, of which the following is a full, clear, and exact description, reference being had to the accompanying drawings.
The object of this invention is to provide an extremely-cheap and at the same time efficient wheel for use on small vehicles, as toys of one sort or another, baby-carriages, &c.

The invention is hereinafter more fully described and its essential characteristics set out in the claim.

In the drawings, Figure 1 is a perspective view of our wheel. Fig. 2 is a vertical cross-section through the hub on a plane parallel with the side of the wheel. Fig. 3 is a cross-section through the rim on a similar plane. Fig. 4 is a transverse cross-section through the hub. Fig. 5 is a transverse section of the rim.
The hub of the wheel comprises a tube A, which is adapted to surround the axle, and a pair of heads B thereon, which carry the inner ends of the spokes. The tube A has shoulders $a$, against which the heads abut.
This tube is cheaply made from a flat sheet of metal having grooves bent into it to form the shoulders $a$ and then rolled until the edges substantially abut, as shown in the drawings.

Each of the heads B consists of a washer $b$, abutting against the shoulders $a$, and a member $b'$, which surrounds the tube A outside of the disk $b$ and has a flange $b^2$, extending inwardly over the edge of the disk, and there has ears $b^3$, bent downward on the inner side of the disk.

The spokes (designated C) are made of wire, a single piece of wire constituting two spokes connected together at their inner ends by the portion $c$. At such connecting part the spokes pass through a pair of adjacent openings $b^4$ in the flange $b^2$ of the member $b'$. As shown in the drawings, there are six of these openings $b^4$ in each of the heads B, and this provides for the reception of the inner ends of three of the double-armed spokes shown. At their outer ends the spokes pass through openings $d$ in the rim D and are then bent substantially at right angles, as at $c'$, to lie along the outer side of this rim. These bent-over portions $c'$ are covered by a tire $d'$, which lies on the outer side thereof and is held in place by the rolled-over edges $d^2$ of the rim. The rolling over of these edges may be conveniently done after the ends of the spokes are bent over and the tire-strip $d'$ put in place. The abutting ends of the rim are held in place by the tire-strip $d'$, whose meeting ends come at a different place from those of the rim.

After the wheel is assembled as above described it is dipped in the usual galvanizing solution.

It will be seen that our wheel is extremely cheap and simple in construction. Practice has demonstrated that it has ample strength for very many uses where a light wheel is desired.

We claim—

In a wheel, the combination of a hub having heads thereon, a series of spokes attached to said heads at their inner ends, being at their outer ends bent down and fitted to the outer side of a rim, said rim having openings in its main portion through which the ends of the spokes are passed, and having flanges along each edge, and a tire for said rim placed over the same and secured thereto by having the said flanges bent over upon its edges so as to firmly embrace and secure the same.

In testimony whereof we hereunto affix our signatures in the presence of two witnesses.

FRANK JOHN HALL.
            AXEL W. HAWKINSON.

Witnesses:
   JOHN BROOKS,
   F. M. STEVENS.